Figure 1:
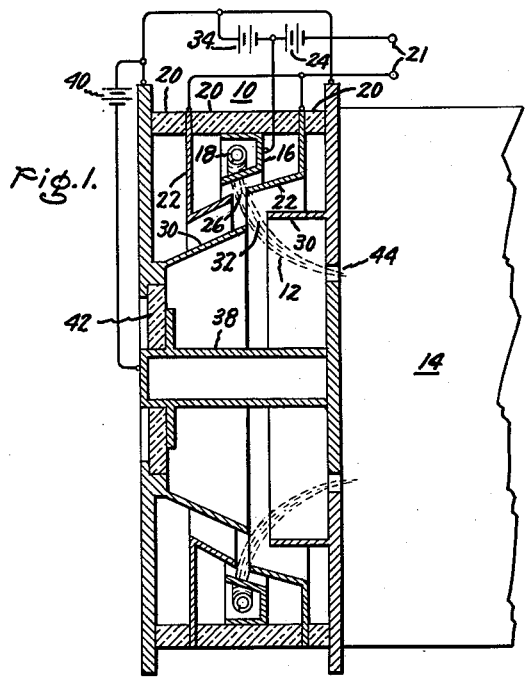

Inventor:
Lawrence A. Harris,
by Paul A. Frank
His Attorney.

3,013,179
SYSTEM FOR PRODUCING HIGH CHARGE DENSITY ELECTRON BEAM
Lawrence A. Harris, Scotia, N.Y., assignor to General Electric Company, a corporation of New York
Filed May 1, 1958, Ser. No. 732,320
5 Claims. (Cl. 315—31)

The present invention relates to an electron gun for producing a controllable magnitude high charge density electron beam.

A high charge density electron beam is an electron beam in which the effects from mutual repulsion of the electrons—called space charge effects—are of the order of magnitude of the focusing effects in conventional electron guns. If the charge magnitude of the electron beam is varied, the space charge effects are altered and consequently also the focusing with the result that the paths and velocities of the electrons are so seriously affected that elaborate means must be provided to compensate for the changes in these quantities.

Accordingly, an object of the present invention is to provide an electron gun for producing a high charge density electron beam in which the charge magnitude of the beam can be controlled without a significant change in the paths or velocities of the electrons in the beam.

In some conventional electron guns the charge magnitude of the high charge density electron beam is controlled—usually to obtain modulation—through variations of the anode voltage. But this voltage is usually too large to be varied quickly and easily.

Thus, another object is to provide an electron gun for producing a high charge density electron beam in which the charge magnitude of the beam is controlled through variations of a small voltage.

If positive voltage grid electrode action is utilized in a conventional electron gun for controlling the charge density of a high charge density electron beam, attracted electrons may heat the grid electrode so that it melts or warps. If negative voltage grid electrode action is used in a conventional electron gun, a high charge density electron beam can not be obtained.

Hence, a further object of the present invention is to provide an electron gun in which grid electrode action is utilized for controlling the charge magnitude of a high charge density electron beam.

Still another object is to provide an electron gun in which negative voltage grid electrode action is utilized for controlling the charge magnitude of a high charge density electron beam.

These and other objects are achieved in one embodiment of my invention in which a high charge density electron beam is produced by an electron gun having a large anode electrode voltage that causes the electrons in the electron beam to pass through the anode electrode before space charge forces can produce significant effects. Because of this large voltage, the grid electrode may be biased negative and yet a high current density electron beam obtained. After passing through the anode electrode, the electron beam is subjected to a decelerating force in the direction of and of a much greater magnitude than the forces due to space charge effects, so that the space charge forces do not have a significant effect. This decelerating force abstracts the radial velocity energy of the electron beam without appreciably affecting the axial velocity and thereby converts the high current density electron beam into a high charge density electron beam.

Figure 2:
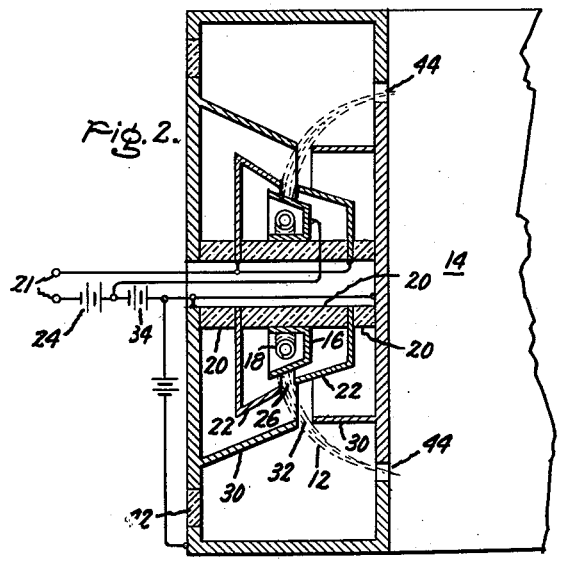

The novel features believed characteristic of the invention are set forth in the appended claims. The invention itself, together with further objects and advantages thereof may best be understood by reference to the following description, taken in connection with the accompanying drawing, in which:

FIG. 1 is a cross-sectional view of one cylindrically-arranged electron gun embodiment for producing a high charge density annular electron beam, and FIG. 2 is a cross-sectional view of another cylindrically arranged electron gun embodiment for producing a high charge density annular electron beam.

Referring now to FIG. 1, I have illustrated a cylindrically-arranged electron gun 10 for producing a high charge density annular electron beam 12 that is injected into a utilization region 14 which may, for example, be an interaction region in which beam 12 interacts with the radio-frequency fields of a klystron, a travelling-wave tube or another beam-type microwave discharge device. The details of region 14 are not illustrated since they are only incidental to the present invention which is in the electron gun 10.

In electron gun 10, electron beam 12 after being produced by means illustrated as a cathode electrode 16, which is heated by a filament 18 and mounted on an insulating wall 20, is controlled in density by a voltage applied through two input terminals 21 to a grid electrode 22—biased preferably negatively by a source 24—which has an annular opening 26 for the passage of beam 12. As the electrons emerge from cathode electrode 16, an anode electrode 30 having an annular opening 32, accelerates and imparts to these electrons a large radial velocity and the desired axial velocity, when made positive in potential by a source of potential 34. Means, illustrated as a decelerating electrode 38, is maintained at a negative potential with respect to anode electrode 30 by a source of potential 40 to oppose the radial velocity of beam 12 and to abstract the radial velocity energy therefrom. At one end, decelerating electrode 38, is insulated from anode electrode 30 by an insulator 42, while at its other end, it forms with anode electrode 30 a circular opening 44 for the passage of electron beam 12 into region 14. In some applications, it may be desirable to have separately insulated conductors on the edges of opening 44 that can be maintained at adjustable potentials.

If it is desired that electron gun 10 inject into region 14 a hollow cylindrical electron beam having an axial velocity corresponding to 100 volts, a source 34 may supply to anode electrode 30 a voltage of the order of 1,000 volts. With this high voltage and the proximity of electrode 30 to cathode 16, there is a very large field that moves the electrons from cathode 16 through hole 32 in anode electrode 30 in a time so short that the space charge forces do not have sufficient time to produce a significant spreading of beam 12. Consequently, any change in the current magnitude of beam 12 and thus, any change in the space charge effects, has no significant effect between cathode electrode 16 and anode electrode 30. Of course the above numerical values are cited only to illustrate the nature of the relationship between the total velocity at anode electrode 30 and the axial velocity and are not to be construed in a limiting sense.

In a conventional electron gun, the anode electrode is operated at a potential corresponding to the desired final velocity of the electrons. Therefore, if electron gun 10 were conventionally operated, a potential of approximately 100 volts would be applied to electrode 30, which is so small that grid electrode 22 could not be biased negatively because this negative bias would predominate over this positive anode potential to limit the current magnitude of electron beam 12 to a low density beam. But with an anode potential of 1,000 volts, the field from electrode 30 is so strong at cathode 16 that a high current density electron beam 12 can be obtained even though grid electrode 22 is biased negatively.

Another advantage of my invention is that the current density magnitude of beam 12 can be controlled by a small voltage applied to terminals 21. This is in contrast to prior systems in which beam current is changed by variation of the relatively large anode voltage.

The tilt of cathode 16 and the voltage on anode 30 as well as the position thereof are arranged by conventional considerations so that beam 12 has the desired axial velocity when it leaves hole 32. Due to the large voltage on anode 30, beam 12 also has a very large radial velocity, not tolerable in region 14, that is decreased approximately to zero by the radial field resulting from the potential from source 40 applied to decelerating electrode 38. For the expressed conditions, the potential from source 40 should be of the order of 1,500 volts negative with respect to anode electrode 30. Due to this large voltage difference and the proximity of electrodes 30 and 38, the electric force on beam 12 between electrodes 30 and 38 is very large and is directed approximately radially outwardly in opposition to the radial movement of the electrons in beam 12 such that the radial movement decreases to zero just as the electrons reach hole 44. Since the decelerating forces are directed radially outward between electrodes 30 and 38, in the same direction as the space charge forces, and since the decelerating forces are so much greater, they overwhelmingly predominate during the passage of beam 12 between openings 32 and 44. Consequently, when the current magnitude of beam 12 changes, the resultant change in space charge effects has no significant effect on the paths or velocities of the electrons in beam 12 as they pass through the region between holes 32 and 44.

Although the electron gun 10 is illustrated as producing a hollow beam 12, the concepts of my invention are equally applicable to an electron gun that produces an beam in the shape of a sheet, or a segment of a sheet. Then, of course, the electron gun 10 is not cylindrically arranged.

Returning to consideration of the cylindrically disposed gun of FIG. 1, the edges of grid electrode 22 and also any irregularity in electron gun 10 produce scattering of some of the electrons in beam 12 such that these scattered electrons are imparted with circumferential motion about beam 12. When the radius of beam 12 decreases, the angular velocity of these circumferentially moving electrons increases due to the conservation of angular momentum, such that the energies of these electrons are transformed in increasing proportions into kinetic energy of angular movement. For some of the electrons, so much radial movement kinetic energy is transformed that these electrons cannot reach opening 44 and thus, are removed from the circuit. This scattering effect is not so significant in my embodiment illustrated in FIG. 2, which is structurally the same as that of FIG. 1 with the exception that the FIG. 2 embodiment is arranged to project the electron beam 12 radially outward rather than inward.

In the embodiment of FIG. 2 the electrons scattered by grid electrode 22 and the irregularities in electron gun 10 receive circumferential motion at a small radius. When the radius of beam 12 increases, the angular velocity of these electrons, and thus, the angular energy, decreases due to the conservation of angular momentum. Consequently, these electrons have sufficient energy to reach opening 44.

In the foregoing discussion I have mentioned the charge density of beam 12 and also the current density. Of course, the desired end result is an electron beam of controllable high charge density entering region 14. However, this result is obtained in the present invention, by making the current density large near cathode 16 and by controlling its magnitude. However, the charge density in this region may be small even though the current density is large since the magnitude of the voltage on anode electrode 30 is great enough that the electrons move from cathode 16 to anode 30 with a very high velocity. Further on in the electron gun, when the radial velocity of beam 12 decreases due to the action of decelerating electrode 38, the radial component of the current density decreases to a relatively small value due to the decrease in radial velocity while the charge density increases correspondingly.

Of course, the action of electrodes 22 and 30 in focusing beam 12 to approximately a line in opening 44 also increases the charge density. This focusing action may be derived from conventional electron optic considerations.

While the invention has been described with respect to certain specific embodiments, it will be appreciated that many modifications and changes may be made by those skilled in the art without departing from the spirit of the invention. I intend, therefore, by the appended claims, to cover all such modifications and changes as fall within the true spirit and scope of my invention.

What I claim as new and desire to secure by Letters Patent of the United States is:

1. A system for producing a high charge density, focused electron beam for high power tube operation at a predetermined velocity parallel to a line, comprising means for producing a high current density electron beam, an electron gun structure including an accelerating electrode for imparting to said beam a large velocity component normal to said line and a smaller velocity component parallel to said line approximately equal to said predetermined velocity, said accelerating electrode subjecting said beam to forces that are large compared to the forces in said beam due to space charge and electrode means and means energizing said electrode means with a voltage to produce forces much greater in magnitude than the forces due to space charge effects in said electron beam and decrease said normal velocity component to substantially zero.

2. An electron gun system for producing a high charge density annular electron beam having a predetermined velocity in the direction of the axis thereof comprising a plurality of electrodes including an annular cathode and an annular anode supported in the order named and radially displaced with respect to one another, said electrodes being supported to direct an electron beam at an angle to the axis of the annular electron beam and means applying a voltage to said annular anode to impart to the electron beam an axial component of velocity substantially equal to said predetermined velocity and a larger radial component of velocity, electrode means radially displaced from said anode and means energizing said last-mentioned electrode means to neutralize said radial component of velocity.

3. An electron gun system for producing a high charge density annular electron beam having a predetermined velocity in the direction of the axis thereof comprising a plurality of electrodes including an annular cathode, an annular control electrode and an annular anode supported in the order named in radially displaced relation, said electrodes being supported to direct an electron beam at an angle to the axis of the angular electron beam and means applying a voltage to said annular anode to accelerate the electron beam to a velocity of greater magnitude than said predetermined velocity of the annular beam and including a radial component of velocity which is substantially larger than the axial component thereof and electrode means radially displaced outwardly from said anode and means energizing said last-mentioned electrode means to neutralize said radial component of velocity.

4. A system for producing a high charge density, focused electron beam for high power tube operation along the axis of an electron discharge device comprising a cathode electrode tilted with respect to said axis for producing an electron beam at an acute angle to said axis, a grid electrode positioned adjacent said cathode electrode, means for applying a potential to said grid electrode for controlling the current density of said electron beam, an anode electrode positioned adjacent said grid electrode and having at least one opening therein for the passage of said electron beam, the position of said anode being related to the position and tilt of said cathode electrode such that when said anode electrode is positive in potential with respect to said cathode electrode said electron beam is accelerated to a velocity having an axial component and a radial component that is of at least as large as said axial component, means for applying a positive potential on said anode electrode with respect to said cathode electrode, a decelerating electrode positioned to produce a radial electric field upon the application of a negative potential with respect to the potential of said anode electrode, and means for applying on said decelerating electrode a potential negative with respect to the potential on said anode electrode and of sufficient magnitude to decrease the radial velocity of said electron beam to substantially zero.

5. A system for producing a high charge density, focused hollow electron beam for high power tube operation and for injecting said beam along the axis of an electric discharge device, said system comprising an annular-shaped cathode, a grid electrode with an annular-shaped opening adjacent said cathode electrode and an anode electrode with an annular-shaped opening adjacent said grid electrode for producing a high current density electron beam directed at an acute angle with respect to the axis of said electric discharge device and having a radial component of velocity which is large compared to the axial component thereof, an annular-shaped decelerating electrode adjacent said anode electrode having a cylindrical surface coaxial with said axis and means energizing said decelerating electrode to neutralize the radial component velocity of said beam.

References Cited in the file of this patent

UNITED STATES PATENTS

| | | |
|---|---|---|
| 2,163,787 | Henneberg | June 27, 1939 |
| 2,452,044 | Fox | Oct. 26, 1948 |
| 2,721,287 | Van Ormer | Oct. 18, 1955 |
| 2,801,361 | Pierce | July 30, 1957 |
| 2,812,467 | Kompfner | Nov. 5, 1957 |
| 2,813,990 | Robertson | Nov. 19, 1957 |
| 2,935,642 | Swartz | May 3, 1960 |